United States Patent
Marcos Moreira da Silva et al.

(10) Patent No.: US 10,414,278 B2
(45) Date of Patent: Sep. 17, 2019

(54) WALL MOUNTABLE DC ELECTRIC VEHICLE CHARGER

(71) Applicant: EFACEC ELECTRIC MOBILITY, S.A., Moreira da Maia (PT)

(72) Inventors: Pedro Nuno Marcos Moreira da Silva, Moreira da Maia (PT); Vitor Alexandre Martins Ferreira, Moreira da Maia (PT); Susana Marinho Ferreira Guedes, Moreira da Maia (PT); Lino Joao Da Silva Pauperio Pereira, Moreira da Maia (PT); Ines Sofia Marques Ramos, Moreira da Maia (PT); Paulo Miguel Silva Cecilio Goncalves, Moreira da Maia (PT); Germano Miguel Oliveira da Silva, Moreira da Maia (PT)

(73) Assignee: EFACEC ELECTRIC MOBILITY, S.A., Moreira da Maia (PT)

( * ) Notice: Subject to any disclaimer, the term of this patent is extended or adjusted under 35 U.S.C. 154(b) by 232 days.

(21) Appl. No.: 15/514,268

(22) PCT Filed: Aug. 17, 2015

(86) PCT No.: PCT/IB2015/056251
§ 371 (c)(1),
(2) Date: Mar. 24, 2017

(87) PCT Pub. No.: WO2016/046661
PCT Pub. Date: Mar. 31, 2016

(65) Prior Publication Data
US 2017/0282729 A1    Oct. 5, 2017

(30) Foreign Application Priority Data

Sep. 25, 2014 (PT) .......................... 107918

(51) Int. Cl.
*B60L 11/18* (2006.01)
*H02J 7/00* (2006.01)
(Continued)

(52) U.S. Cl.
CPC ........... *B60L 11/1818* (2013.01); *B60L 53/16* (2019.02); *B60L 53/22* (2019.02); *B60L 53/30* (2019.02);
(Continued)

(58) Field of Classification Search
CPC .............................. H02J 7/0027; H02J 7/0042
(Continued)

(56) References Cited

U.S. PATENT DOCUMENTS 3,681,663 A * 8/1972 Albers ..................... H02B 1/28
174/50
2006/0028178 A1   2/2006 Hobbs
(Continued)

FOREIGN PATENT DOCUMENTS

JP    2013070589 A    4/2013

OTHER PUBLICATIONS

International Search Report and Written Opinion dated Nov. 3, 2015 for PCT/IB2015/056251.

*Primary Examiner* — Richard V Muralidar
(74) *Attorney, Agent, or Firm* — Lucas & Mercanti, LLP

(57) ABSTRACT

A solution to solve the problem of embodying a wall mountable electric vehicle DC fast charger is disclosed: a wall mountable electric vehicle DC charger (201), comprising a modular AC to DC converter unit comprising at least one high frequency AC to DC power converter module placed in the interior back of the charger, a cooling system with input and output channels placed on the back of the charger, between said charger and a wall (202), a wireless network interface and a central processing unit. In one
(Continued)

embodiment, the unit does not incorporate a display for messages and commands and, instead, has the possibility of turning a mobile computational device (301) into a command console of the charger sending commands using wireless communication (302). It is useful for quick charging with DC electric power in different situations: private users, fleets, companies, condominiums, garages, car dealers and also in public places.

6 Claims, 3 Drawing Sheets

(51) Int. Cl.
*B60L 53/16* (2019.01)
*B60L 53/22* (2019.01)
*B60L 53/30* (2019.01)
*B60L 53/31* (2019.01)
*B60L 53/60* (2019.01)
*H02M 7/00* (2006.01)

(52) U.S. Cl.
CPC ............. *B60L 53/305* (2019.02); *B60L 53/31* (2019.02); *B60L 53/60* (2019.02); *H02J 7/0027* (2013.01); *H02J 7/0042* (2013.01); *H02J 7/0052* (2013.01); *H02J 2007/0059* (2013.01); *H02J 2007/0096* (2013.01); *H02M 7/003* (2013.01); *Y02T 10/7005* (2013.01); *Y02T 10/7055* (2013.01); *Y02T 10/7088* (2013.01); *Y02T 10/92* (2013.01); *Y02T 90/121* (2013.01); *Y02T 90/127* (2013.01); *Y02T 90/128* (2013.01); *Y02T 90/14* (2013.01); *Y02T 90/16* (2013.01); *Y02T 90/163* (2013.01)

(58) Field of Classification Search
USPC .................................................. 361/676, 678
See application file for complete search history.

(56) References Cited

U.S. PATENT DOCUMENTS

2011/0291616 A1\* 12/2011 Kim ..................... B60L 3/003
    320/109
2013/0153200 A1\* 6/2013 Rembach ............ F28D 15/0275
    165/287

\* cited by examiner

WALL MOUNTABLE DC ELECTRIC VEHICLE CHARGER

CROSS REFERENCE TO RELATED APPLICATION

This Application is a 371 of PCT/IB2015/056251 filed on Aug. 17, 2015, which claims priority of Portuguese Application No. 107918 filed Sep. 25, 2014, both of which are incorporated herein by reference.

TECHNICAL FIELD

The present application relates to a wall mountable Direct Current (DC) electric vehicle charger.

BACKGROUND

Nowadays, electric vehicles comprise an onboard Alternate Current (AC) to DC converter that allows battery charging with AC electric power, a type of power easily available in many places requiring relatively simple chargers. Due to its size, weight and cost, the onboard converter is limited in amount of power, which entails, in the case of many vehicle models, the charging process usually taking several hours before completion.

In order to charge faster, higher power converters are used off board, supplying DC power to the electric vehicle's battery. For example, document US2013020993A1 disclose such a charger. Since fast charging DC chargers require considerable power, these are normally embodied in floor standing units, not suitable to installation in every place.

The document IEC 61851-23:2014, an international standard prepared and published by the International Electrotechnical Commission, gives the requirements for DC electric vehicle charging stations, for conductive connection to the vehicle, with an AC or DC input voltage up to 1000 V AC and up to 1500 V DC according to IEC 60038. It provides the general requirements for the control communication between a DC electric vehicle charging station and an electric vehicle. The requirements for digital communication between DC electric vehicle charging station and electric vehicle for control of DC charging are defined in IEC 61851-24.

Wall mountable chargers overcome the cited problems since they have a reduced weight and size, allowing an easy installation procedure in most places. The problem is that these are usually only achieved for the AC type.

SUMMARY

The present application discloses a wall mountable electric vehicle charger, comprising:
- two fixing wall supports mounted on the back of the charger, used to fix the charger to the wall and to create a space between these in which the airflow circulates;
- a modular AC to DC converter unit comprising at least one removable/insertable high frequency AC to DC power converter module placed in the interior back of the charger;
- a cooling system with input and output channels placed on the back of the charger spaced between 1 cm to 20 cm apart;
- a wireless network interface; and
- a central processing unit configured to control the cooling system and to operate the wireless network interface to communicate with a mobile computational device;

wherein the number of high frequency power converter modules included in the modular AC to DC converter unit adjustable in order to achieve the desired output power.

In one embodiment, the electric vehicle charger further comprises a movable front panel wherein the power converter modules are inserted and removed through the entry created by moving said panel.

In another embodiment, the wireless network interface uses any of the following communication protocols:
- Wi-Fi;
- Bluetooth;
- Infrared;
- Near Field Communication; or
- any other wireless communication protocol.

In a further embodiment, the electric vehicle charger further comprises a remote connection to a central server through a communication network.

In one embodiment, the communication network is the internet.

The present application also discloses a method of installing the wall mountable electric vehicle charger, comprising the following steps:
- mount the mountable electric vehicle charger without the power converter modules; and
- insert the power converter modules inside the charger through the entry created by moving the front panel.

The present application further discloses the use of the wall mountable electric vehicle charger, wherein the charger is mounted in a garage.

The present application discloses the use of the wall mountable electric vehicle charger, wherein the charger is mounted in a car dealership.

The present application discloses the use of the wall mountable electric vehicle charger, wherein the charger is mounted in a condominium.

GENERAL DESCRIPTION

The present application presents a solution that intends to solve the problem of embodying a wall mountable electric vehicle DC fast charger.

Disclosed is a wall mountable electric vehicle DC charger, comprising:
- two fixing wall supports mounted on the back of the charger, used to fix the charger to the wall and to create a space between these in which the airflow circulates;
- a modular AC to DC converter unit comprising at least one removable/insertable high frequency AC to DC power converter module placed in the interior back of the charger;
- a cooling system with input and output channels placed on the back of the charger;
- a wireless network interface; and
- a central processing unit.

The high frequency converters use the AC supply frequency as input, but have an intermediate stage with a frequency in the kHz range or higher, which allows the size of transformers and other passive power components to be considerably smaller. Using converter modules of up to 10 kW limits the weight and size of each one.

The number of high frequency converter modules, which have a reduced size, is selected in order to achieve the desired output power. For example, 3 converters of 8 kW are used to achieve a 24 kW output power. Furthermore, the high frequency allows the magnetic and passive components to be smaller.

The compact size of the wall mountable electric vehicle DC charger requires an adequate cooling system. It is undesirable for the airflow to be directed to the front of the charger. Hence, the charger comprises an interval from 1 cm to 20 cm in the back, where the air is taken from and where the air goes out. Airflow channels are also comprised, to make the air circulate inside.

To further reduce the weight and size, the unit does not incorporate a display for messages and commands, instead has the possibility of wirelessly communicating with a mobile computational device, turning this one into the command console of the charger. Wireless communications can be established using Wi-Fi, Bluetooth, Infrared, Near Field Communication or any other wireless communication protocol.

The modular AC to DC converter unit comprises at least one removable/insertable high frequency AC to DC power converter module. Said converter modules are placed on the back of the charger and are easily inserted and removed by moving the front panel. By having a structure that allows the modules to be inserted in the modular AC to DC converter unit, after the charger is mounted in place, the weight is lower while the mounting process is conducted, so producing an additional effect of allowing an easy installation, being very functional for construction, installation and maintenance.

In one embodiment, the charger has a remote connection to a central server, allowing it to be remotely managed. Several embodiments of the present charger, can be combined in a set and connected through a communication network, for example the internet, to the same server in order to form a networked electric vehicle system.

In one embodiment, the modular AC to DC converter unit is controlled and managed by control electronics and software, to be adequate for the requirements of DC electric vehicle charging as defined in IEC61851-23. In one embodiment, the mountable electric vehicle charger implements system A, also known as CHAdeMO, in another embodiment implements system B, and in other embodiment implements system C, also known as Combo or Combined Charging System (CCS), of said standard.

The present electric vehicle charger achieves the desired miniaturization that allows it to have enough low weight and volume to be mounted in several possible locations.

It is useful for quick charging with DC electric power in different situations: private users, fleets, companies, condominiums, garages, car dealers and also in public places.

Since it has output power high enough, for example a minimum value of 8 kW, to enable a quicker charge than what is possible with the AC input of many cars, which is limited in power, usually a maximum of 7 kW and only in some cases can be more.

BRIEF DESCRIPTION OF DRAWINGS

Without intent to limit the disclosure herein, this application presents attached drawings of illustrated embodiments for an easier understanding.

MODE(S) FOR CARRYING OUT EMBODIMENTS

Figure 1:
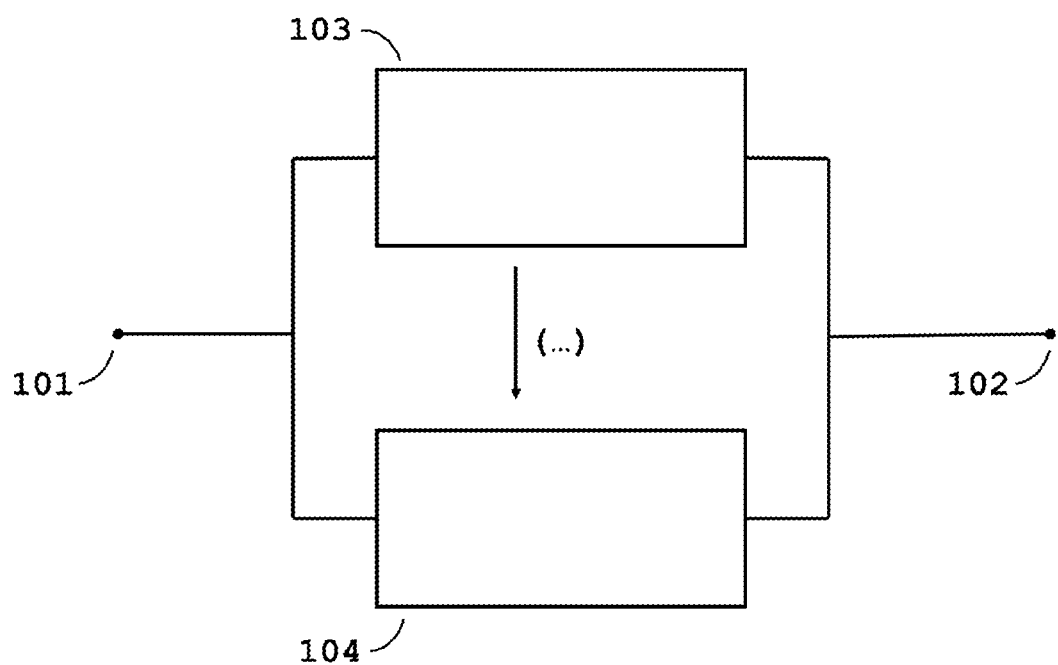
FIG. 1 illustrates a circuit diagram of various AC to DC power conversion modules, where the reference numbers show:
101—AC input;
102—DC output;
103—AC to DC power conversion module 1; and
104—AC to DC power conversion module N.

Referring to the drawings, herein are described optional embodiments in more detail, which however are not intended to limit the scope of the present application.

FIG. 1 illustrates a circuit diagram of the modular AC to DC converter unit comprising various AC to DC power conversion modules placed inside the wall mountable electric vehicle charger. The modules (103, 104) are placed in parallel between the AC input (101) and the DC output (102).

Figure 2:
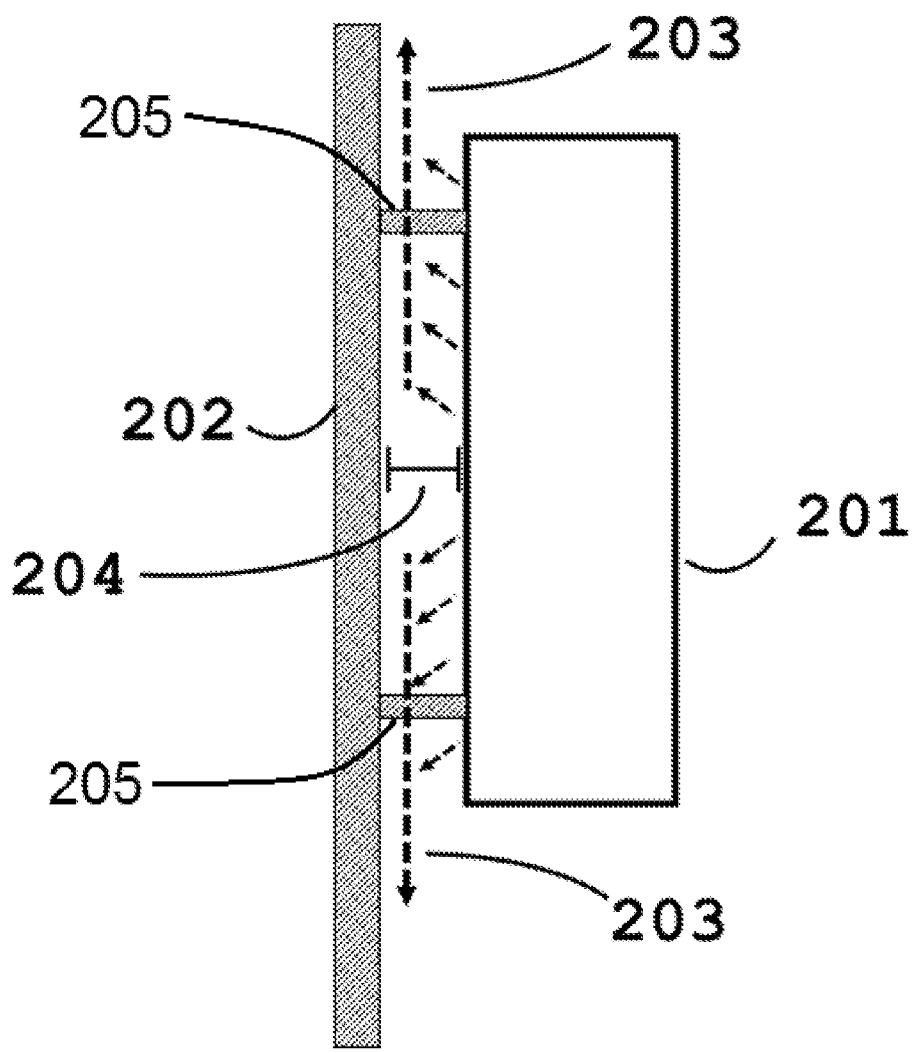
FIG. 2 illustrates an embodiment of the wall mountable electric vehicle charger in position, where the reference numbers show:
201—wall mountable electric vehicle charger;
202—wall;
203—air flow;
204—space between charger and wall; and
205—fixing wall supports.

FIG. 2 illustrates an embodiment of the wall mountable electric vehicle charger (201) in position, mounted in a wall (202), allowing the creation of an air flow (203) with a space between the charger and the wall (204). This airflow is created by the cooling system with input and output channels placed on the back of the charger.

Figure 3:
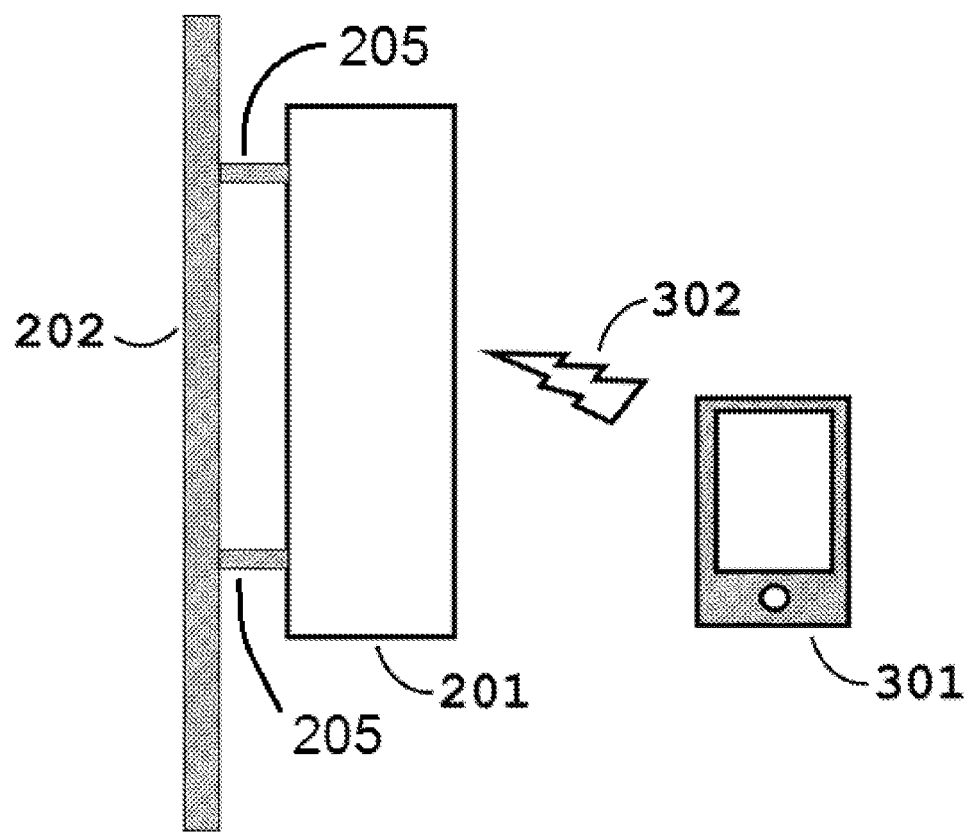
FIG. 3 illustrates an embodiment of controlling the wall mountable electric vehicle charger using a mobile computational device, where the reference numbers show:
201—wall mountable electric vehicle charger;
202—wall;
205—fixing wall supports
301—mobile computational device; and
302—wireless communication.

FIG. 3 illustrates an embodiment of controlling the wall mountable electric vehicle charger (201) in position, mounted in a wall (202), using a mobile computational device (301). Commands are sent to the wall mountable electric vehicle charger (201) through wireless communication (302). The unit does not incorporate a display for messages and commands and, instead, has the possibility of turning the mobile computational device (301) into a command console of the charger.

Naturally, the present embodiments are not in any way limited to the embodiments described in this document and a person with average knowledge in the field will be able to predict many possible changes to it without deviating from the main idea, as described in the claims.

The invention claimed is:

1. A wall mountable electric vehicle charger system, comprising:
   an electric vehicle charger adapted to be mounted on a wall, the electric vehicle charger comprising:
   a front side and a back side;
   a modular AC to DC converter unit comprising at least one removably insertable high frequency AC to DC power converter module, wherein the at least one removably insertable high frequency AC to DC power converter module has an intermediate stage having a one of a frequency in a kHz range or a frequency in a range higher than a kHz range, wherein the modular AC to DC converter has an output of at least 8 kW;
   a cooling system having an input channel and an output channel spaced between 1 cm to 20 cm apart;
   a wireless network interface; and a central processing unit configured to control the cooling system and to operate the wireless network interface to communicate with a mobile computational device; and first and second wall supports mounted on the back side of the charger, the first and second wall supports being adapted to attach the electric vehicle charger to a wall and to create a distance between 1 and 20 cm between the electric vehicle charger and the wall, the distance creating a space sufficient to allow a flow of air to circulate;

wherein a quantity of the at least one removably insertable high frequency AC to DC power converter modules included in the modular AC to DC converter unit is adjustable in order to achieve a desired output power.

2. The wall mountable electric vehicle charger system according to claim 1, further comprising a movable front panel adapted to be moved from a closed position and an open position, wherein the at least one removably insertable high frequency AC to DC power converter module is inserted and removed through an entry opening created by moving the movable front panel to the open position.

3. The wall mountable electric vehicle charger system according to claim 1, wherein the wireless network interface uses one of the following communication protocols:

Wi-Fi;

Bluetooth;

Infrared; or

Near Field Communication.

4. The wall mountable electric vehicle charger system according to claim 1, further comprising a remote connection to a central server through a communication network.

5. The wall mountable electric vehicle charger system according to claim 4, wherein the communication network is the internet.

6. A method of installing the wall mountable electric vehicle charger system of claim 2, comprising:

mounting the wall mountable electric vehicle charger on a selected wall without the at least one removably insertable high frequency AC to DC power converter modules; and inserting the at least one removably insertable high frequency AC to DC power converter modules inside the wall mountable electric vehicle charger through the entry opening created by moving the movable front panel to the open position.

* * * * *